United States Patent
Sanchez et al.

(10) Patent No.: US 10,691,683 B1
(45) Date of Patent: Jun. 23, 2020

(54) SYSTEM AND METHOD OF ELECTRONIC DISTRIBUTION AND TRANSFORMATION OF ELECTRONIC INFORMATION IN A CENTRALIZED MANNER

(71) Applicant: BLUEOWL, LLC, San Francisco, CA (US)

(72) Inventors: Kenneth J. Sanchez, San Francisco, CA (US); Blake Konrardy, San Francisco, CA (US); Micah Wind Russo, Oakland, CA (US); Eric Dahl, Newman Lake, WA (US)

(73) Assignee: BLUEOWL, LLC, San Francisco, CA (US)

( * ) Notice: Subject to any disclaimer, the term of this patent is extended or adjusted under 35 U.S.C. 154(b) by 341 days.

(21) Appl. No.: 15/713,929

(22) Filed: Sep. 25, 2017

(51) Int. Cl.
   *G06F 16/00* (2019.01)
   *G06F 16/242* (2019.01)
   *H04W 72/02* (2009.01)
   *H04W 4/20* (2018.01)
   *H04W 72/08* (2009.01)
   *H04W 4/60* (2018.01)

(52) U.S. Cl.
   CPC .......... *G06F 16/244* (2019.01); *H04W 4/203* (2013.01); *H04W 72/02* (2013.01); *H04W 72/087* (2013.01); *H04W 4/60* (2018.02)

(58) Field of Classification Search
   None
   See application file for complete search history.

(56) References Cited

U.S. PATENT DOCUMENTS

| | | | |
|---|---|---|---|
| 2005/0159991 A1* | 7/2005 | Hashuber | G06Q 10/10 718/102 |
| 2014/0113619 A1* | 4/2014 | Tibbitts | G07C 5/008 455/419 |
| 2016/0070749 A1* | 3/2016 | Sharma | G06F 16/244 707/741 |
| 2017/0364549 A1* | 12/2017 | Abalos | G06Q 30/016 |
| 2018/0211334 A1* | 7/2018 | Akselrod | G06Q 50/01 |

* cited by examiner

*Primary Examiner* — Anhtai V Tran
(74) *Attorney, Agent, or Firm* — Faegre Drinker Biddle & Reath LLP (57) ABSTRACT

A system and methods relate to, inter alia, aggregating electronic information generated at a first computing environment. The system and methods further relate to receiving a message for at least a portion of the electronic information from a second computing environment. The system and methods further relate to determining whether the aggregated electronic information is available. The system and methods further relate to transforming the electronic information from a first type to a second type in response to determining that the aggregated electronic information is available, the first type comprising an electronic information type of the electronic information generated at the first computing environment and the second type comprising another electronic information type consumable by the second computing environment. The system and methods further relate to transmitting at least a portion of the transformed electronic information to the second computing environment.

17 Claims, 7 Drawing Sheets

SYSTEM AND METHOD OF ELECTRONIC DISTRIBUTION AND TRANSFORMATION OF ELECTRONIC INFORMATION IN A CENTRALIZED MANNER

TECHNICAL FIELD

The present disclosure relates generally to electronic distribution and modification of electronic information in a centralized manner, and particularly, inter alia, to a system and methods for aggregating electronic information generated at a plurality of computing environments and transforming the electronic information such that it is made available for the plurality of computing environments.

BACKGROUND

Various computing environments across various industries generate various electronic information. For example, in the gaming industry, a gaming services environment may generate a series of high-resolution visual images to display a video game that a video game company's end-user (e.g., customer) can play. As another example, in the insurance industry, an insurance services environment may generate an algorithm for determining premium discounts for its end-user (e.g., driver). Accordingly, computing environments in different industries may generate different types of electronic information. Computing environments within the same industry or even same business entity may generate different types of electronic information. For instance, a computing environment for a particular insurance services entity may generate an algorithm, for one of its policies, to determine a driver's driving score, whereas another computing environment for another or even the same insurance services entity may generate telematics data about a driver based on strategic placement of sensors in the driver's vehicle.

End-users often engage with many different computing environments. For example, an end-user (e.g., a driver) that engages with an insurance services environment to track premium discounts may also engage with a gaming services environment to play a video game on his mobile device (e.g., a smartphone). With the rise in technology developments and/or end-user demands, novel ways of attracting end-users are being realized, which may involve utilizing electronic information conventionally associated with a computing environment within one industry at another industry. For example, the gaming services environment that created the popular location-based augmented reality game "Pokemon Go" has shown that there is a need to generate or acquire electronic information associated with another computing environment (e.g., a mapping environment such as "Google Maps"). Accordingly, what is envisioned is a novel way to automate and facilitate the aggregation of electronic information generated at a plurality of computing environments and making such electronic information readily available for the plurality of computing environments, especially with the advent of numerous computing environments that that generate electronic information having different types and formats.

BRIEF SUMMARY

The present embodiments disclose systems and methods that may generally relate to electronic distribution and modification of electronic information in a centralized manner, and particularly, inter alia, to a system and methods for aggregating electronic information generated at a plurality of computing environments and transforming the electronic information such that it is made available for the plurality of computing environments.

Accordingly, in some embodiments, a system and methods may aggregate, via wireless communication or data transmission over one or more radio links or digital communication channels, electronic information generated at a first computing environment. The electronic information may comprise at least one of an algorithm or electronic data. The system and methods may further receive a message for at least a portion of the electronic information from a second computing environment. The message may comprise an identification of an end-user. The system and methods may further determine whether the aggregated electronic information associated with the end-user is available. The system and methods may further transform the electronic information from a first type to a second type in response to determining that the aggregated electronic information associated with the end-user is available. The first type may comprise an electronic information type of the electronic information generated at the first computing environment, and the second type may comprise another electronic information type consumable by the second computing environment. The system and methods may further transmit at least a portion of the transformed electronic information to the second computing environment.

In some embodiments, an interconnected wireless communication system may include a processor, transceiver, sensors and one or more memory devices storing non-transitory computer readable instructions that when executed cause the processor to aggregate, via wireless communication or data transmission over one or more radio links or digital communication channels, electronic information generated at a first computing environment. The electronic information may comprise at least one of an algorithm or electronic data. The instructions may further cause the processor to receive a message for at least a portion of the electronic information from a second computing environment. The message may comprise an identification of an end-user. The instructions may further cause the processor to determine whether the aggregated electronic information associated with the end-user is available. The instructions may further cause the processor to transform the electronic information from a first type to a second type in response to determining that the aggregated electronic information associated with the end-user is available. The first type may comprise an electronic information type of the electronic information generated at the first computing environment, and the second type may comprise another electronic information type consumable by the second computing environment. The instructions may further cause the transceiver to transmit at least a portion of the transformed electronic information to the second computing environment.

Advantages will become more apparent to those skilled in the art from the following description of the preferred embodiments which have been shown and described by way of illustration. The combination of aggregating and transforming electronic information enables the present system and methods to enhance sharing of electronic information. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present embodiments are not limited to the precise arrangements and instrumentalities shown, wherein.

DETAILED DESCRIPTION

The present embodiments may generally relate to electronic distribution and modification of electronic information in a centralized manner, and particularly, inter alia, to a system and methods for aggregating electronic information generated at a plurality of computing environments and transforming the electronic information such that it is made available for the plurality of computing environments.

Figure 1:
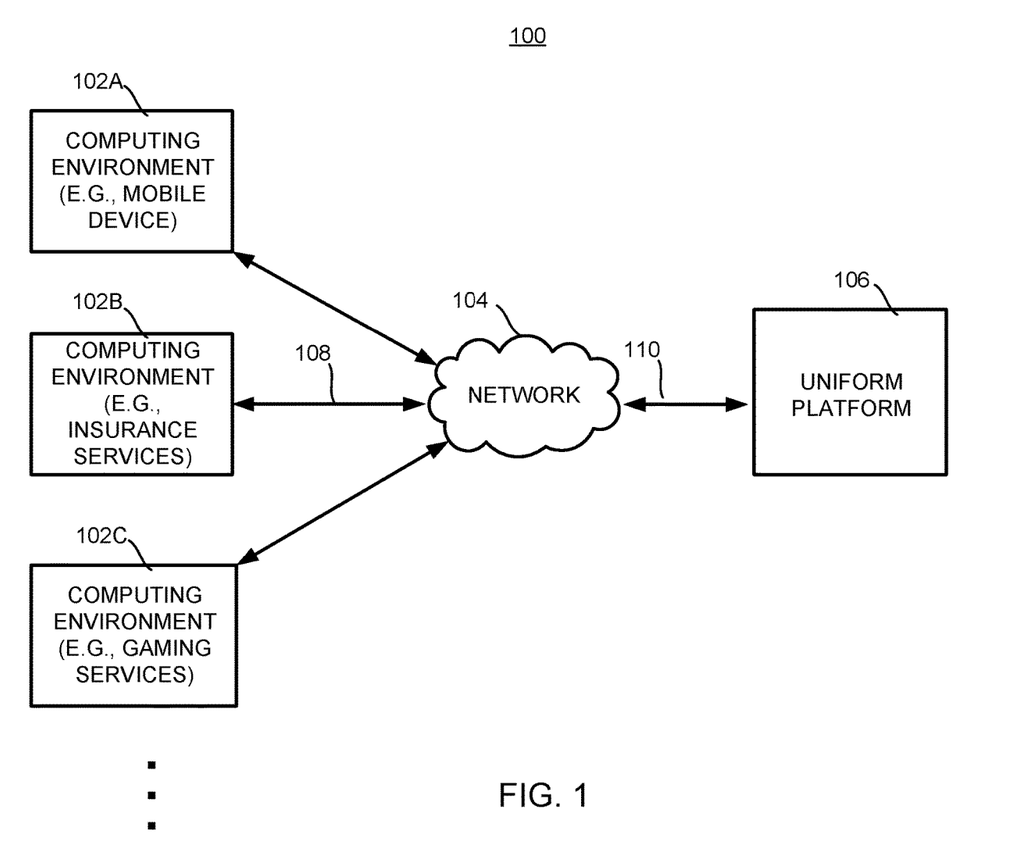
FIG. 1 illustrates an exemplary block diagram of an exemplary interconnected wireless communication system on which the methods described herein may be implemented according to some embodiments.

FIG. 1 illustrates a block diagram of an interconnected wireless communication system 100 in accordance with some embodiments on which the methods described herein may be implemented. The communication system 100 may generally be divided into front-end components and back-end components, both of which may include hardware and software applications, as well as various data communications channels for communicating data between the various hardware and software components. The front-end components may include a plurality of computing environments 102 of similar or different types or that support similar or different business purposes or industries. An example of such computing environments 102 include a mobile device (e.g., a smart phone, a cellular phone, a tablet computer, a special purpose or general use computing device, smart watch, wearable electronics such as augmented reality appliance, and the likes). The mobile device may be configured to generate or receive data, such as telematics data.

In a vehicle technology context, a mobile device, which may be embedded in a vehicle (e.g., a car), may be configured to receive or generate telematics data regarding the speed, force, heading, and/or direction associated with movements of the vehicle, using sensors either embedded in the mobile device or in the vehicle. Telematics data may also indicate which autonomous vehicle control feature is operating in the vehicle. Examples of sensors include a GPS unit, a digital camera, a video camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, and an inductance sensor. Some of the sensors (e.g., radar, LIDAR, or camera units) may actively or passively scan the vehicle environment for obstacles (e.g., other vehicles, buildings, pedestrians, etc.), roadways, lane markings, signs, or signals. Other sensors (e.g., GPS, accelerometer, or tachometer units) may provide data for determining the location or movement of the vehicle. Other sensors may be directed to the interior or passenger compartment of the vehicle, such as cameras, microphones, pressure sensors, thermometers, or similar sensors to monitor the vehicle operator and/or passengers within the vehicle 108. The mobile device may be configured to execute one or more algorithms, programs, or applications to generate, collect, or analyze various types of data from one or more sensors mounted or installed within the vehicle.

Other examples of such computing environments 102 include insurance services, gaming services (e.g., video game development platforms), and any other suitable service for delivering data over a network (e.g., the Internet) such as text, images, and other media, as well as relevant devices configured to include processing, memory, and communications capabilities used for the relevant services. The computing environments 102 may also receive data (e.g., personal identification data, previous history data) associated with end-users that the computing environments 102 serve, and/or generate electronic information (e.g., data or algorithms) to serve its end-users.

For example, a computing environment associated with an insurance service, such as computing environment 102B, may acquire an end-user's (e.g., driver's) personal identification (e.g., via username and password credentials or other suitable end-user identifiable information entered by the end-user using a user interface) to determine that the end-user is actually an end-user of the insurance service, prior to tracking its end-user's prior historical behavior (e.g., via telematics data, collected by either a distinct computing environment such as computing environment 102A, to track driving behavior, or by the computing environment 102B itself) to generate driving-telematics data for the end-user. The computing environment 102B may generate other data, such as an end-user's driving score, which may be tied to a driver's premium, using the generated driving-telematics data for the end-user. As will be described below, the generated data or any driving-tracking algorithms used to generate such data may be shared with other computing environments (e.g., computing environment 102C) via the uniform platform 106.

As another example, a computing environment associated with a gaming service may create and/or host a video game that is compatible for its end-user's (e.g., gamer's) mobile device. It may acquire an end-user's (e.g., gamer's) personal identification (e.g., via username and password credentials or other suitable end-user identifiable information entered by the end-user using a user interface) to determine that the end-user is actually an end-user of the gaming service. An augmented reality driving video game that incorporates an end-user's actual driving behavior may track the end-user's prior historical behavior (e.g., prior saved gaming performance, which may include data representative of augmented reality driving behavior) to generate data (e.g., driving-telematics data) for the end-user. As will be described below, the generated data or any driving-tracking algorithms used to generate such data may be shared with other computing environments (e.g., computing environment 102B) via the uniform platform 106.

Computing environments 102 described above may include hardware (e.g., mobile device, server, processor, memory, network interfaces), software (operating system, firmware, applications, a user interface, processes executing on hardware), or both, and may also be configured to operate for the relevant service. Computing environments 102 may also be configured to convert, encrypt, and/or decrypt any of the electronic information communicated from/to other computing environments 102.

In some embodiments, the computing environments 102 may be configured to store the electronic information and/or send the electronic information to back-end components, such as the uniform platform 106, via a network 104. The computing environments 102 may be configured to send and/or receive electronic information from network 104 using one or more suitable communication protocols, such as a Wi-Fi direct protocol, an ad-hoc cellular communication protocol, and the likes. Network 104 may be a proprietary network, a secure public internet, a virtual private network or some other type of network, such as dedicated access lines, plain ordinary telephone lines, satellite links, cellular data networks, or a combination thereof. Network 104 may be implemented as a wireless telephony network (e.g., GSM, CDMA, LTE, etc.), a Wi-Fi network (e.g., via one or more IEEE 802.11 Standards), a WiMAX network, a Bluetooth network, and the likes. The network 104 may include one or more radio frequency communication links, such as wireless communication links 108 and 110 to communicate with the computing environments 102 and uniform platform 106, respectively. The network 104 may comprises the Internet, and data communications may take place over the network 104 via an Internet communication protocol.

In preferred embodiments, the uniform platform 106 may be a server configured to receive the electronic information that was generated or recorded by the computing environments 102. Uniform platform 106 may have one or more software modules stored in memory, that when executed by a processor, may aggregate electronic information received from the various computing environments 102 via the network 104, organize the electronic information, store the electronic information, transform the electronic information, and/or communicate metadata associated with the electronic information or the electronic information itself back to the computing environments 102. In preferred embodiments, electronic information may be electronic data or algorithms that process electronic data. For example, the uniform platform 106 may aggregate insurance data (e.g., end-user personal information, driving record, driving history, etc.) for a single end-user and/or an insurance algorithm for a single end-user (e.g., algorithm that receives end-user personal information, driving record, driving history, etc. and outputs a driving score) received from computing environment 102B associated with an insurance service and create a uniform profile for that single end-user stored in memory. Because electronic information pertaining to insurance data and insurance algorithm is keyed to the single end-user in the uniform profile that is stored in memory, the uniform platform 106 may check the uniform profile when computing environments 102 submits a message for electronic information along with identification information pertaining to the single end-user. In some embodiments, the uniform profile may comprise a searchable data table that comprises a SQL-based data table. In some embodiments, the uniform platform 106 may aggregate electronic information for a plurality of end-users, and accordingly create a uniform profile for a plurality of end-users. Because the uniform platform 106 may aggregate electronic information received from the various computing environments 102 of similar or different types or that support similar or different business purposes or industries, the uniform platform 106 may create a uniform profile, either for a single end-user or a collective group of end-users, that includes various electronic information about the single end-user or group of end-users.

For example, if a single end-user newly enrolls in an insurance policy developed and/or maintained by computing environment 102B and had previously played a video game that was generated by computing environment 102C, the computing environment 102B may send a message, including within the message the end-user's identification information, to the uniform platform 106, which may in turn check the uniform profile to determine if any electronic information associated with the end-user's video game account exists. Here, because the uniform profile may include electronic information such as the end-user's prior saved gaming performance, which may include data representative of augmented reality driving behavior, the uniform platform 106 may indicate to the computing environment 102B that such electronic information exists, and may transmit some or all of the electronic information in a format that is consumable by the computing environment 102B. In some embodiments, the uniform platform 106 may transmit some or all of the electronic information as-is without any transformation or format changes. In some embodiments, the uniform platform 106 may determine which electronic information to include in the uniform profile for the end-user based on metadata embedded in the electronic information generated or received from the computing environments 102. For example, if metadata concerned with the end-user's prior saved gaming performance data shows that the single end-user last played a video game generated by computing environment 102C a decade ago, the metadata may be discarded and not added into the uniform profile for the single end-user because the electronic information may be outdated. Thus, by using metadata for example, the uniform platform 106 may appropriately include or exclude electronic information in the uniform platform, as well as permit or disallow electronic information to flow from one computing environment to another.

In some embodiments, because the uniform platform 106 may aggregate electronic information received from the various computing environments 102 of similar or different types or that support similar or different business purposes or industries, the uniform platform 106 may transform the electronic information, such as by normalizing the electronic information or affiliated metadata, to maintain a consistent type or format of electronic information consumable by the various computing environments 102. One example in which the uniform platform 106 may normalize electronic information is by upending a personal identifier associated with the end-user to each of the electronic information or meta-information received from the environments 102. As the uniform platform 106 receives electronic information from the computing environments 102 associated with new end-users, the uniform platform 106 may be configured to dynamically create new uniform profiles and/or add the new end-users to existing uniform profiles. The uniform platform 106 may also be configured to dynamically adapt its software modules to aggregate electronic information received from new computing environments 102 that interface with the uniform platform 106 via the network 104.

In some embodiments, the uniform platform 106 may be a machine learning server (i.e., server that is trained using supervised or unsupervised machine learning). A machine learning model may be developed to allow parametric or nonparametric statistical analysis of large quantities of the electronic information. The machine learning model may be used to automatically identify relevant variables (i.e., variables having statistical significance or a sufficient degree of explanatory power) from electronic information that was generated or recorded by the computing environments 102. This may include identifying relevant variables or estimating the effect of such variables that indicate actual observations in the electronic information. This may also include identifying latent variables not directly observed in the electronic information, viz. variables inferred from the observed electronic information. In some embodiments, the machine learning model described herein may be developed by algorithm(s) to identify and estimate the effects of observed or latent information. The machine learning model may employ a neural network, which may be a convolutional neural network, a deep learning neural network, or a combined learning model or program that learns in two or more fields or areas of interest. Machine learning may involve identifying and recognizing patterns in existing electronic information in order to facilitate making predictions. Models may be created based upon example inputs of electronic information in order to make valid and reliable predictions for novel inputs.

Additionally or alternatively, the machine learning model may be trained by inputting sample data sets or certain data into algorithm(s), such as data from the sensors discussed herein. The machine learning model may be developed by deep learning algorithm(s) that are primarily focused on pattern recognition, and may be trained after processing multiple examples. The learning algorithm(s) themselves may also be improved, thereby leading to improved machine learning models. A plurality of learning algorithms may be cycled through to test different hyper parameters of different machine learning models in order to find the best learning model or models. Different models may work better for different inputting sample data sets or certain electronic information. The machine learning model may include Bayesian program learning (BPL), voice recognition and synthesis, image or object recognition, optical character recognition, and/or natural language processing—either individually or in combination. The machine learning model may also include natural language processing, semantic analysis, automatic reasoning, and/or machine learning.

In supervised machine learning, the uniform platform 106 may be provided with example inputs and their associated outputs, and may seek to discover and/or train a machine learning model that maps inputs to outputs, so that when subsequent novel inputs are provided the processing element may, based upon the discovered or trained machine learning model, accurately predicts the correct or a preferred output. The training process for the machine learning model continues until the model achieves a desired level of accuracy on subsequent novel inputs. Example algorithms used to discover and train such supervised models include logistic regression and back propagation neural network. In unsupervised machine learning, the uniform platform 106 may be required to find its own structure in unlabeled example inputs to prepare a machine learning model. In one embodiment, machine learning techniques may be used to extract the control signals generated by computer systems or sensors, and under what conditions those control signals were generated. Example algorithms used to discover and train unsupervised machine learning models include the Apriori algorithm and k-Means.

After training with initial electronic information from computing environment 102, the machine learning model (or information generated by such machine learning model) may be used to evaluate additional electronic information from the same computing environments 102. Such electronic information may be related to past electronic information already gathered by the uniform platform 106. The trained machine learning model may then be used for determining, assessing, analyzing, predicting, estimating, evaluating, or otherwise processing new electronic information not included in the initial electronic information. Such new or additional electronic information may be related to current, up-to-date, or real-time data gathered by the sensors, or other similar data to be analyzed or processed. Such a trained machine learning model may, thus, be used to perform part or all of the analytical functions of the methods described elsewhere herein.

Although the system 100 is shown to include three computing environments 102 and one uniform platform 106, it should be understood that additional computing environments 102 and uniform platforms 106 may be utilized. For example, the system 100 may include several uniform platforms 106, each uniform platform 106 dedicated for a particular functionality, such as receiving electronic information from dedicated computing environments 102, receiving messages for electronic information from dedicated computing environments 102, and sending requested electronic information to dedicated computing environments 102. Furthermore, the processing performed by the one or more uniform platforms 106 may be distributed among a plurality of uniform platforms 106 in a cloud computing arrangement. This configuration may provide various advantages, such as enabling near real-time uploads and downloads of electronic information, as well as periodic uploads and downloads of electronic information. This may in turn support a thin-client embodiment of the computing environments 102 discussed herein.

Figure 2:
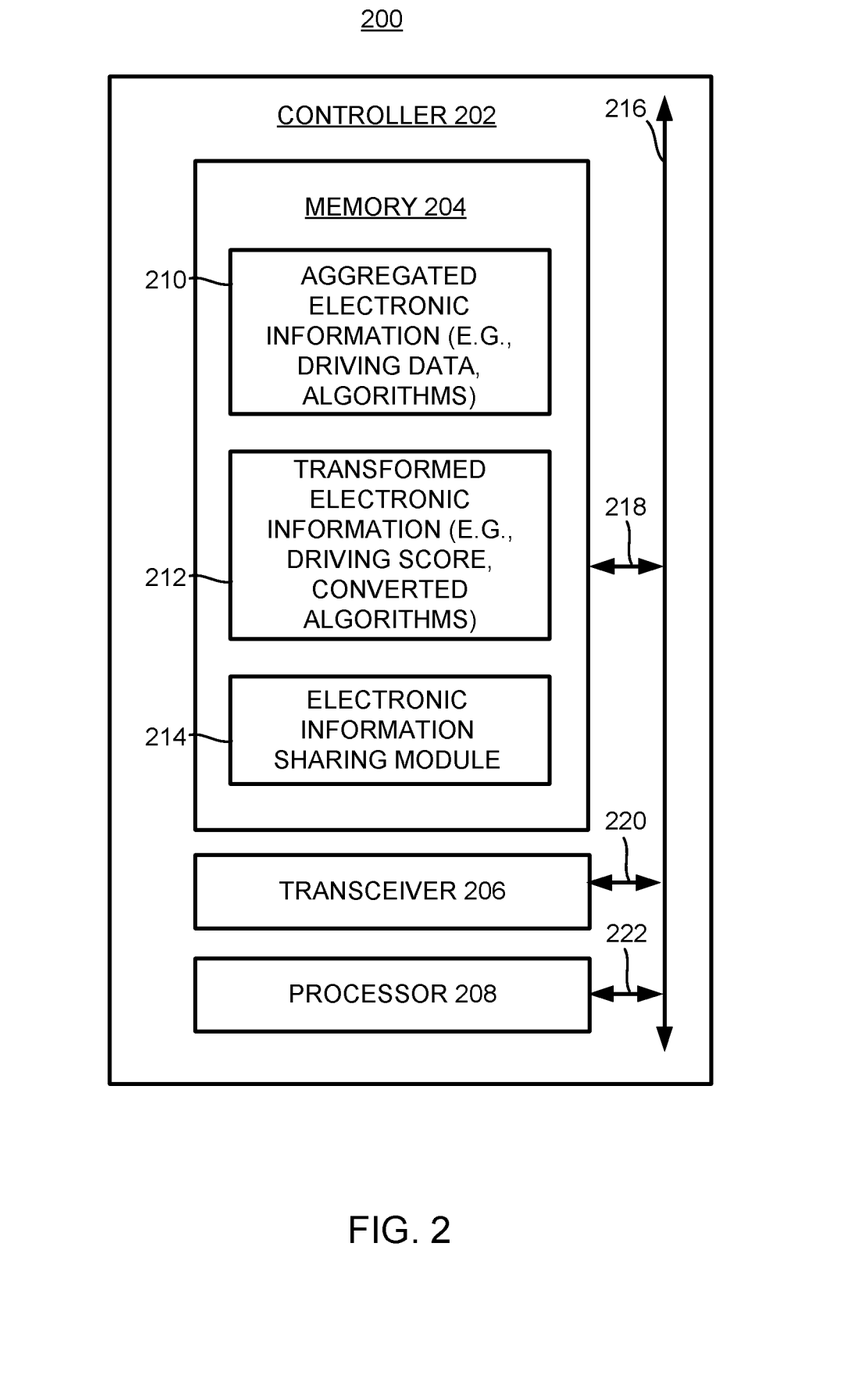
FIG. 2 illustrates an exemplary block diagram of an exemplary uniform platform according to some embodiments.

FIG. 2 is a diagram showing an example of uniform platform 200 in accordance with some embodiments. In some embodiments, uniform platform 106 of system 100 of FIG. 1 may be implemented with the example uniform platform 200 of FIG. 2. The uniform platform 200 may comprise a controller 202 that is operatively connected to the network 104 via wireless communication or data transmission over one or more radio links or digital communication channels 110. The controller 202 may include a memory 204, a transceiver 206, and processor 208, all of which may be interconnected via an address/data bus 216. Specifically, transceiver 206 may interface with the processor 208 and communicate, via link 222, to the network 104 and any of the computing environments 102 communicatively coupled to the network 104. The memory 204 of the controller 202 may include one or more RAMs and one or more program memories. The RAM and program memory, communicatively coupled to the address/data bus 216 via link 218, may be implemented as semiconductor memories, magnetically readable memories, or optically readable memories, for example. The memory 204, specifically program memory, may store various modules, which may include electronic information sharing module 214. In addition, memory 204, specifically RAM, may store electronic information, such as aggregated electronic information 210 (e.g., driving data, algorithms) and transformed electronic information 212 (e.g., driving score, converted algorithms). The electronic information sharing module 214 may be executed by the same computer processor 208 or by different computer processors. The electronic information sharing module 214 may be implemented, for example, as distinct or integrated software components, which can include module(s), package(s), sub-modules, and/or other sub-components to provide an executable computer program that can perform these described functions when executed on a processor, and can be implemented using a programming language such as C, C++, Java, Objective C, and/or other programming languages. The electronic information sharing module 214, when executed by the processor 208, may (1) aggregate electronic information generated at computing environments 102, (2) store the electronic information (3) receive messages for electronic information (or a portion thereof) from computing environments 102, and/or (4) transform the electronic information if necessary. In some embodiments, the messages may include an identification of an end-user (such as end-user credentials), and the electronic information sharing module 214 may be configured to determine that the aggregated electronic information (or portion thereof) associated with the end-user is available for the requesting computing environment(s) 102 to consume. In some embodiments, the electronic information sharing module 214 may be configured to verify permission settings of a computing environment 102 granting the exchange of electronic information with another computing environment 102. If a computing environment 102 does not grant permission of its generated electronic information, the electronic information sharing module 214 may be configured to prevent other computing environment(s) 102 from accessing the requested electronic information.

The processor 208 may have designated processing cores, and each core can be implemented, for example, as distinct or integrated processing units that read and execute program instructions, such as electronic information sharing module 214, via link 222. The processor 208 may receive electronic information from computing environments 102 via transceiver 208, store the received electronic information as aggregated electronic information 210 in memory 204, transform the electronic information, and store the electronic information as transformed electronic information 212.

In some embodiments, one or more portions of the uniform platform 200 may be implemented as one or more storage devices that are physically co-located with uniform platform 200, or as one or more storage devices utilizing different storage locations as a shared database structure (e.g., cloud storage). In some embodiments, computing environments 102 may be configured to perform any suitable portion of the processing functions locally that have been remotely outsourced from uniform platform 200. For example, computing environments 102 may transform the electronic information for its consumption.

In some embodiments, the uniform platform 200 may be part of a user-centric computing system (or facilitate communications with a computer system), and as such, may access various databases as needed to perform customer service-related functions. Accordingly, electronic information received from computing environments 102 may include user credentials, which may be verified by uniform platform 200 or one or more other external computing devices or servers. These user credentials may be associated with a personal profile, which may include, for example, financial account information, insurance policy numbers, a description and/or listing of insured assets, vehicle identification numbers of insured vehicles, addresses of insured users, contact information, driver's license information, and other suitable personal identification information. In this way, electronic information received from computing environments 102 may allow uniform platform 200 to uniquely identify each end-user. In addition, uniform platform 200 may facilitate the communication of electronic information to their end-users for their review, modification, and/or approval.

Figure 3A:
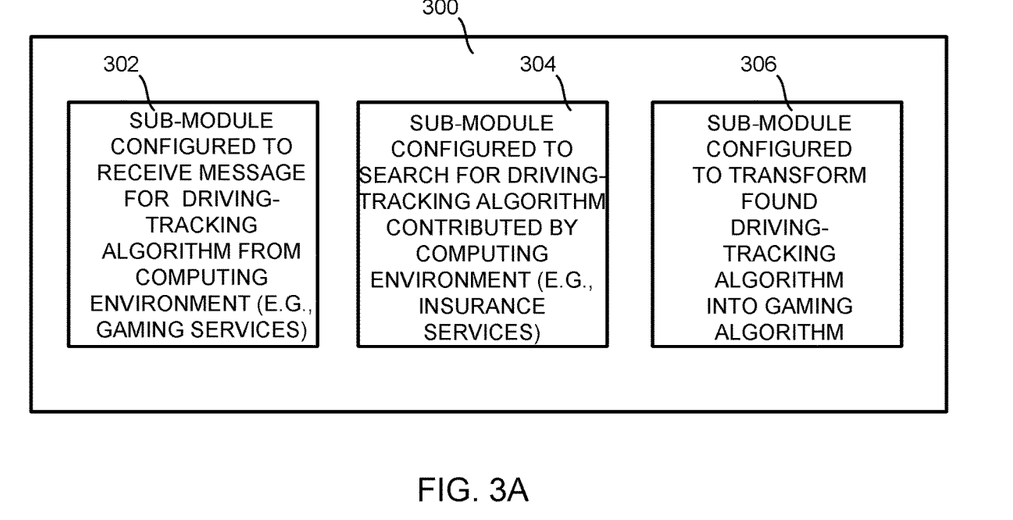
FIG. 3A illustrates an exemplary block diagram of an exemplary electronic information sharing module according to some embodiments.

FIG. 3A is a diagram showing an example electronic information sharing module 300 in accordance with some embodiments. In some embodiments, the electronic information sharing module 214 of uniform platform 200 of FIG. 2 may be implemented with the example electronic information sharing module 300 of FIG. 3A. The electronic information sharing module 300 may comprise sub-modules 302, 304, and 306. Although distinct sub-modules are represented for ease of illustration, more or less sub-modules may be implemented to carry out the functions of the electronic information sharing module 300.

In an embodiment, computing environment 102C, to develop an augmented reality driving video game for example, may seek already existing driving-tracking algorithms developed by other computing environments 102, rather than develop its own driving-tracking algorithms from scratch. The driving-tracking algorithms developed by other computing environments 102 (e.g., computing environment 102B) may not necessarily be designed specifically for the purpose of an augmented reality driving video game, but nevertheless may still be useful for computing environment 102C to consume for other purposes. For instance, the driving-tracking algorithms developed by computing environment 102B may have been designed to determine a driving score for an end-user. Nevertheless, the driving-tracking algorithms developed by computing environment 102B may include algorithms or sub-algorithms that track telematics data to determine ways in which end-users drive, which may prove to be useful for computing environment 102C. Therefore, the computing environment 102C may send a message for a driving-tracking algorithm to the sub-module 302, which may be configured to receive the message. The message may include metadata (e.g., pseudocode, name of algorithm, high-level description, classification, identification of the requesting computing environment, identification of the requested computing environment, or other suitable identifying metadata) that describes a particular or general driving-tracking algorithm the computing environment 102C is seeking. The metadata may also include a desired type the computing environment 102C is expecting the driving-tracking algorithms to be in. For example, if the computing environment 102C is developing an augmented reality driving video game based on a certain programming language (e.g., C++), metadata may indicate that the computing environment 102C is seeking a gaming algorithm type in C++, not a driving-tracking algorithm programmed in another language. The metadata may also include any other details for the desired algorithm, such as number of variables, run-time, efficiency, and any other suitable details to measure an algorithm.

The sub-module 302 may parse the metadata and send some or all of the parsed information to sub-module 304 to search for driving-tracking algorithms contributed by computing environments 102 based on the parsed information. In other embodiments, the sub-module 302 may forward the message and metadata to the sub-module 304, and the sub-module 304 may be configured to parse the metadata. The sub-module 304 may access memory 204 that stores metadata for all available driving-tracking algorithms received from computing environments 102 to find a desired driving-tracking algorithm for computing environment 102C that meets the some or all of the criteria identified in the metadata.

In some embodiments, the sub-module 304 may be configured to send the results of the search back to the sub-module 302, which in turn may be configured to forward the search results to the originally requesting computing environment 102C. If multiple search results are found (e.g., more than one driving-tracking algorithm found), the sub-module 304 may be configured to receive additional information from computing environment 102C to narrow the search results. If no search results are found, the sub-module 304 may be configured to receive additional information from computing environment 102C to determine whether the computing environment 102C would like the sub-module 304 to generate a job message for a computing environment(s) 102 to begin work on developing a driving-tracking algorithm. Computing environment 102C, after determining that such driving-tracking algorithm does not exist, may elect to develop the algorithm. However, if the computing environment 102C desires for another computing environment(s) 102 to develop the driving-tracking algorithm on its behalf, the sub-module 304 may be configured to receive confirmation from the computing environment 102C to generate and/or send a job message for a computing environment(s) 102 to begin work on developing a driving-tracking algorithm, in some embodiments. The job message may include some or all of the criteria identified in the metadata. Upon completion of the developed driving-tracking algorithm from a computing environment(s) 102 that accepts the job message, the sub-module 306 may be configured to receive the developed driving-tracking algorithm from the computing environment(s) 102 that accepted the job message.

In other embodiments, the sub-module 304 may be configured to maintain and/or update a list file that keeps track of available aggregated electronic information 210 stored in memory 204, in real-time or intermittently. The list file may store or have access to metadata for all available driving-tracking algorithms received from computing environments 102 to determine whether desired driving-tracking algorithm for computing environment 102C that meets some or all of the criteria identified in the metadata exists in memory 204. As such, rather than waiting to receive confirmation from the computing environment 102C authorizing the sub-module 304 to generate and/or send a job message for a computing environment(s) 102 to begin work on developing a driving-tracking algorithm, the sub-module 304 may be configured to automatically generate and/or send a job message on behalf of the computing environment 102C.

Figure 4:
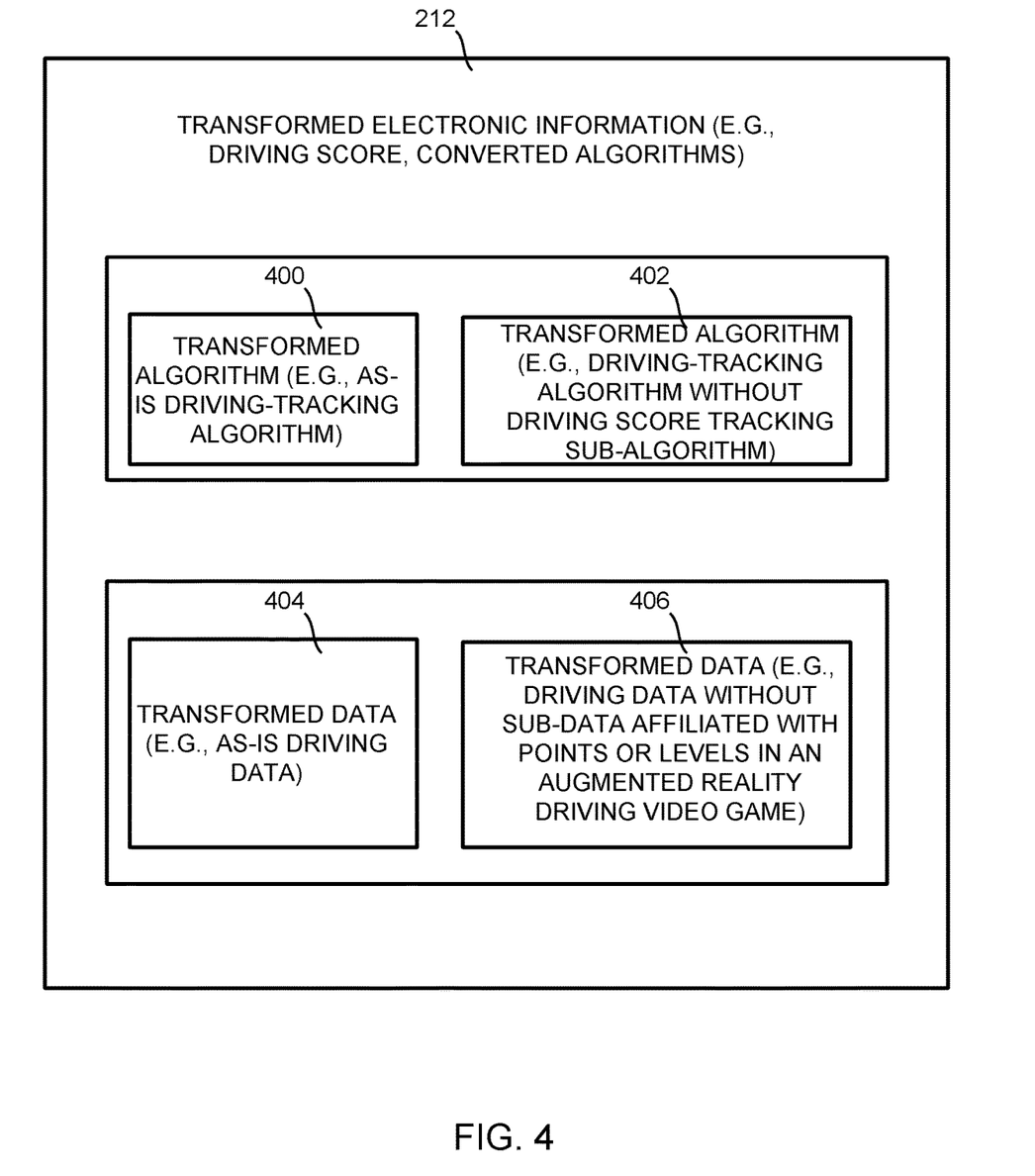
FIG. 4 illustrates an exemplary representation of transformed electronic information according to some embodiments.

The sub-module 304 may be configured to send the driving-tracking algorithm(s) that meets some or all of the criteria identified in the metadata to the sub-module 306 to transform the driving-tracking algorithm(s) into a gaming algorithm useful for computing environment 102C. In one embodiment, based on the metadata, the sub-module 306 may determine that the desired driving-tracking algorithm(s) is already in a type that the computing environment 102C may consume, and thus may forward the desired driving-tracking algorithm(s) to the computing environment 102C as-is. As shown in FIG. 4, the as-is driving-tracking algorithm(s), depicted as as-is driving-tracking algorithm(s) 400, may be stored as transformed electronic information 212 in memory 204. In another embodiment, based on the metadata, the sub-module 306 may determine that the desired driving-tracking algorithm(s) is not in a type that the computing environment 102C may consume, and thus may transform the type into a type that the environment 102C can consume. For example, the sub-module 306 may determine that the driving-tracking algorithm, in addition to having an algorithm or sub-algorithm that utilizes telematics data to determine routes taken by a driver, may contain another algorithm or sub-algorithm that determines a driving score. Because another algorithm or sub-algorithm that determines a driving score may not be necessary for a gaming algorithm that is useful for computing environment 102C, the sub-module 306 may transform the driving-tracking algorithm by eliminating the algorithm or sub-algorithm that determines the driving score. As shown in FIG. 4, the driving-tracking algorithm without the algorithm or sub-algorithm that determines the driving score, depicted as driving-tracking algorithm without driving score tracking 402, may be stored as transformed electronic information 212 in memory 204. Although the driving-tracking algorithm is described to determine driving score, it should be understood that the driving-tracking algorithm may generate information other than driving score that is based on driving information, such as insurance premiums, driving reports, and the likes.

The sub-module 306 may be equipped with machine-learning models to transform driving-tracking algorithm(s), and/or may be configured to communicate with a user-interface for a user (e.g., programmer) associated with the uniform platform 106 to perform a manual transformation of the driving-tracking algorithm(s). The sub-module 306 may be configured to forward the transformed driving-tracking algorithm(s) to the requesting computing environment 102C.

Figure 3B:
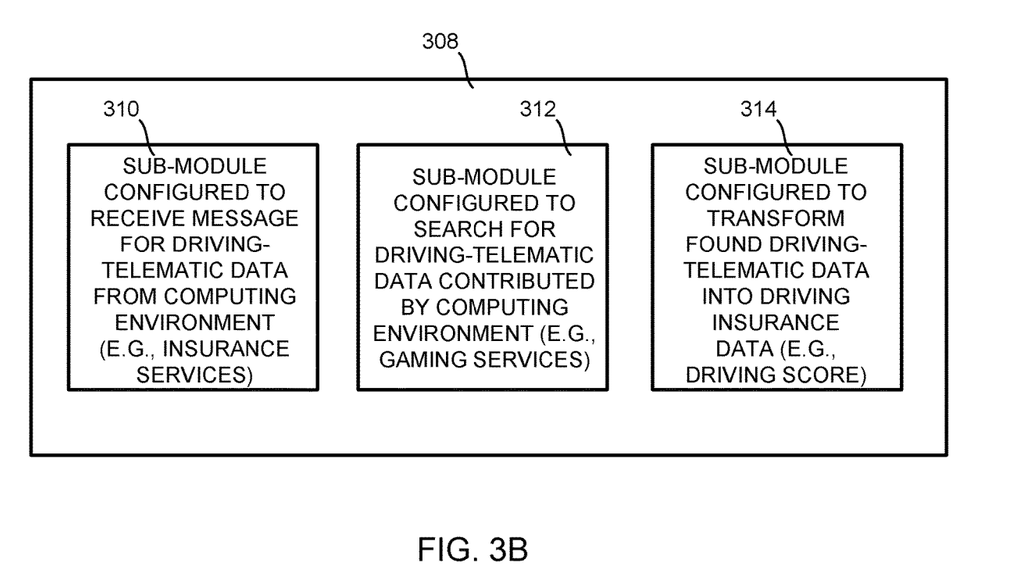
FIG. 3B illustrates an exemplary block diagram of an exemplary electronic information sharing module according to some embodiments.

FIG. 3B is a diagram showing an example electronic information sharing module 308 in accordance with some embodiments. In some embodiments, the electronic information sharing module 214 of uniform platform 200 of FIG. 2 may be implemented with the example electronic information sharing module 308 of FIG. 3B. The electronic information sharing module 308 may comprise sub-modules 310, 312, and 314. Although distinct sub-modules are represented for ease of illustration, more or less sub-modules may be implemented to carry out the functions of the electronic information sharing module 308.

In an embodiment, computing environment 102B, to determine a driving score of a current customer, or even targeted future customer currently not insured by computing environment 102B for example, may seek already existing historical driving data (e.g., telematics data) that has been tracked by other computing environments 102, rather than ignore historical driving data associated with the current or future customer. The driving data tracked by other computing environments 102 (e.g., computing environment 102C) may not necessarily have been tracked specifically for the purpose of determining a driving score from the driving data, but nevertheless may still be useful for computing environment 102B to consume for other purposes. For instance, the driving data tracked by computing environment 102C may have been tracked to advance levels or points in an augmented reality driving video game for an end-user. Nevertheless, the driving data the driving data tracked by computing environment 102C may include driving data that convey ways in which end-users drive, which may prove to be useful for computing environment 102B in determining insurance policies or insurance premiums. Therefore, the computing environment 102B may send a message for driving data to the sub-module 310, which may be configured to receive the message. The message may include metadata (e.g., identification of the current customer or even targeted future customer, period of time corresponding to the driving data, high-level description, geography corresponding to the driving data, identification of the requesting computing environment, identification of the requested computing environment, or any other suitable identifying metadata) that describes the driving data the computing environment 102B is seeking. The metadata may also include a desired type the computing environment 102B is expecting the driving data to be in. For example, if the computing environment 102B is aiming to use the driving data (e.g., how many accidents an end-user has been involved in) to establish a driving score for determining insurance premiums, metadata may indicate that the computing environment 102B is seeking a driving insurance data type, which may be a driving score, not a driving-telematics data type comprising raw telematics data.

The sub-module 310 may parse the metadata and send some or all of the parsed data to sub-module 312 to search for driving data contributed by computing environments 102 based on the parsed data. In other embodiments, the sub-module 310 may forward the message and metadata to the sub-module 312, and the sub-module 312 may be configured to parse the metadata. The sub-module 12 may access memory 204 that stores metadata for all available driving data received from computing environments 102 to find a desired driving data for computing environment 102B that meets the some or all of the criteria identified in the metadata.

In some embodiments, the sub-module 312 may be configured to send the results of the search back to the sub-module 310, which in turn may be configured to forward the search results to the originally requesting computing environment 102B. If multiple search results are found (e.g., more than one piece of driving data), the sub-module 312 may be configured to receive additional information from computing environment 102B to narrow the search results. If no search results are found, the sub-module 312 may be configured to receive additional information from computing environment 102B to determine whether the computing environment 102B would like the sub-module 312 to generate a job message for a computing environment(s) 102 to begin work on gathering driving data. Computing environment 102B, after determining that such driving data does not exist, may elect to gather the driving data. However, if the computing environment 102B desires for another computing environment(s) 102 to gather the driving data on its behalf, the sub-module 312 may be configured to receive confirmation from the computing environment 102B to generate and/or send a job message for a computing environment(s) 102 to begin work on gathering driving data, in some embodiments. The job message may include some or all of the criteria identified in the metadata. Upon completion of gathering driving data from a computing environment(s) 102 that accepts the job message, the sub-module 314 may be configured to receive the gathered driving data from the computing environment(s) 102 that accepted the job message.

In other embodiments, the sub-module 312 may be configured to maintain and/or update a list file that keeps track of available aggregated electronic information 210 stored in memory 204, in real-time or intermittently. The list file may store or have access to metadata for all available driving data received from computing environments 102 to determine whether desired driving data for computing environment 102B that meets some or all of the criteria identified in the metadata exists in memory 204. As such, rather than waiting to receive confirmation from the computing environment 102B to generate and/or send a job message for a computing environment(s) 102 to begin gathering driving data, the sub-module 312 may be configured to automatically generate and/or send a job message on behalf of the computing environment 102B.

The sub-module 312 may be configured to send the driving data that meets some or all of the criteria identified in the metadata to the sub-module 314 to transform the driving data into a driving insurance data useful for computing environment 102B. In one embodiment, based on the metadata, the sub-module 312 may determine that the desired driving data is already in a type that the computing environment 102B may consume, and thus may forward the desired driving data to the computing environment 102B as-is. As shown in FIG. 4, the as-is driving data, depicted as as-is driving data 404, may be stored as transformed electronic information 212 in memory 204. In another embodiment, based on the metadata, the sub-module 314 may determine that the desired driving data is not in a type that the computing environment 102B may consume, and thus may transform the type into a type that the environment 102B can consume. For example, the sub-module 314 may determine that the driving data, in addition to having an data or sub-data affiliated with driving, may contain another data or sub-data affiliated with points or levels in an augmented reality driving video game. Because data or sub-data affiliated with points or levels in an augmented reality driving video game may not be necessary for gaming data that is useful for computing environment 102C, the sub-module 306 may transform the driving data by eliminating the data or sub-data affiliated with points or levels in a augmented reality driving video game, leaving behind data affiliated with purely driving. As shown in FIG. 4, the driving data without data or sub-data affiliated with points or levels in an augmented reality driving video game, depicted as driving data without sub-data affiliated with points or levels in an augmented reality driving video game 406, may be stored as transformed electronic information 212 in memory 204. Although the driving data described may be affiliated with gaining points or advancing levels in an augmented reality driving video game, it should be understood that the driving data described may be affiliated or utilized in other ways within the context of video game, such as generating images of streets and roads, generating computer models of roads, and the likes.

The sub-module 314 may be equipped with machine-learning models to transform driving data, and/or may be configured to communicate with a user-interface for a user (e.g., data analyst) associated with the uniform platform 106 to perform a manual transformation of the driving data. The sub-module 314 may be configured to forward the transformed driving data to the requesting computing environment 102B.

Figure 5:
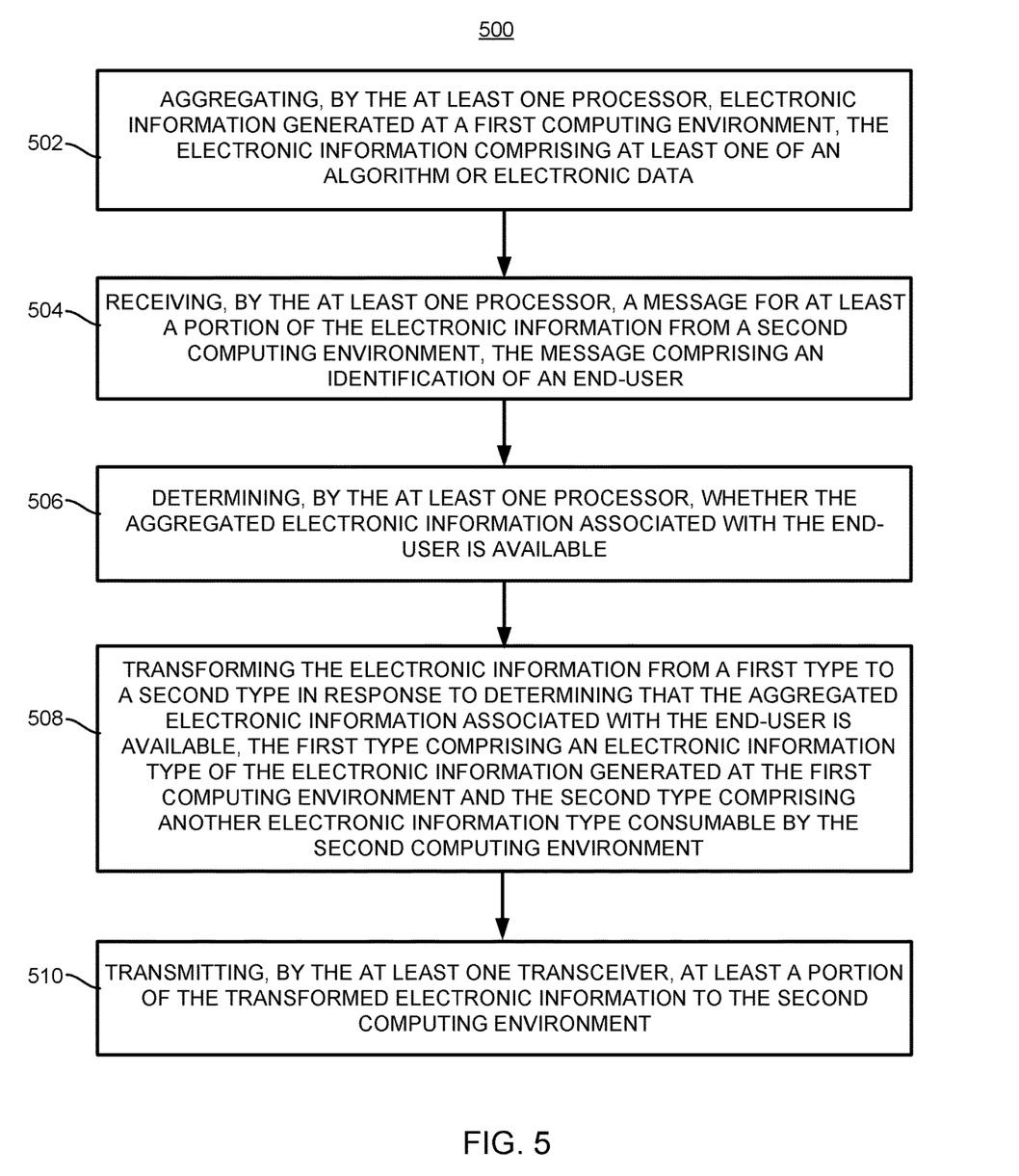
FIG. 5 illustrates an exemplary method for aggregating electronic information generated at a plurality of computing environments and transforming the electronic information such that it is made available for the plurality of computing environments according to some embodiments.

FIG. 5 illustrates a computer-implemented method 500 for transformation of electronic information according to some embodiments. The method 500 may be implemented, in whole or in part, by the system 100 shown in FIG. 1, or more specifically, by uniform platform 106 or 200 shown in FIGS. 1 and 2, implemented via one or more processors (e.g., processor 208), transceivers (e.g., transceiver 206), and/or via computer-executable instructions stored on non-transitory computer-readable medium or media. The method 500 may be stored in memory (e.g., memory 204) as one or more instructions or routines.

The method 500 may begin by aggregating electronic information generated at a first computing environment (block 502). The electronic information comprises at least one of an algorithm or electronic data. For example, uniform platform 200 may aggregate a driving-tracking algorithm from computing environment 102C, driving data from computing environment 102B, or both. In some embodiments, the uniform platform 200 may freely aggregate (e.g., not reject) all electronic information generated at the first computing environment. However, as described below with respect to FIG. 6, the uniform platform 200 may reject some or all of the electronic information generated at the first computing environment in some embodiments.

The method 500 may proceed by receiving a message for at least a portion of the electronic information from a second computing environment (block 504). For example, if computing environment 102C desires driving data that has been aggregated by the uniform platform 200 from computing environment 102B, the uniform platform 200 may receive a message from computing environment 102C for some or all of the driving data. In addition, the message may comprise an identification of an end-user. As such, if the computing environment 102C specifically desires driving data from a certain end-user, such as current end-user or future targeted end-user, the uniform platform 200 may receive, in or with the message from computing environment 102C, identification of the end-user. Similarly, if computing environment 102B desires a driving-tracking algorithm that has been aggregated by the uniform platform 200 from computing environment 102C, the uniform platform 200 may receive a message from computing environment 102B for a portion or all of the driving-tracking algorithm. As such, if the computing environment 102C specifically desires driving-tracking algorithm in which the driving of a certain end-user is tracked, such as current end-user or future targeted end-user, the uniform platform 200 may receive, in or with the message from computing environment 102C, identification of the end-user.

The method 500 may proceed by determining whether the aggregated electronic information associated with the end-user is available (block 506). If the electronic information requested by a computing environment 102 is not available in memory, the requesting computing environment 102 may be notified that the desired electronic information is unavailable. In such a situation, as described above, the uniform platform 200 may generate and/or send a job message to other computing environments 102 so that the computing environment(s) 102 may begin work on gathering the electronic information on behalf of the requesting computing environment 102. Upon aggregating the electronic information back from the computing environment(s) 102 that accepts and completes the job message, the requesting computing environment 102 may be notified that the desired electronic information is available.

The method 500 may proceed by transforming the electronic information from a first type to a second type in response to determining that the aggregated electronic information associated with the end-user is available (block 508). The first type comprises an electronic information type of the electronic information generated at the first computing environment, and the second type comprises another electronic information type consumable by the second computing environment. As discussed above with reference to FIGS. 3A and 3B, the first type and the second type may be the same or different. In some embodiments, if the uniform platform 200 aggregates electronic information that is already in a type that a requesting computing environment 102 may consume, the first type and the second type may be the same. In other embodiments, if the uniform platform 200 aggregates electronic information that is not yet in a type that a requesting computing environment 102 may consume, the first type and the second type may be the different.

The method 500 may proceed by transmitting at least a portion of the transformed electronic information to the second computing environment (block 510).

Figure 6:
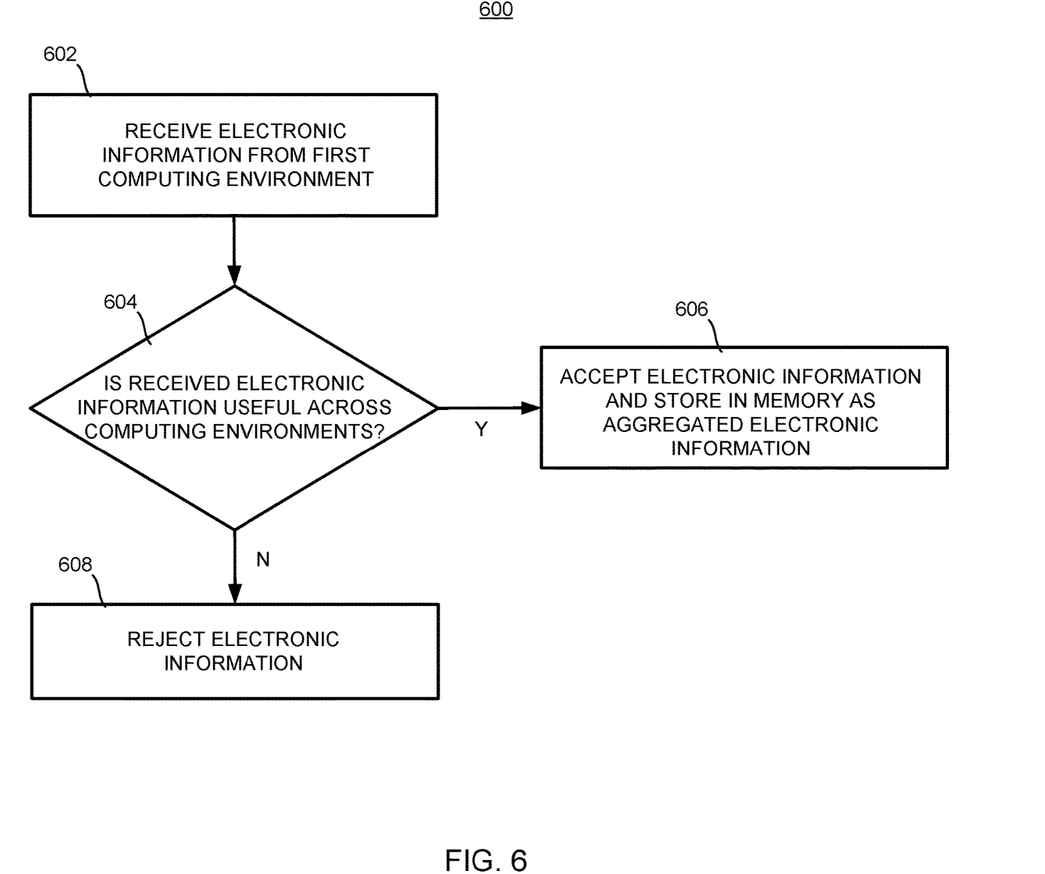
FIG. 6 illustrates an exemplary method for aggregation of electronic information according to some embodiments.

FIG. 6 illustrates a computer-implemented method 600 for aggregation of electronic information according to some embodiments. The method 600 may be implemented, in whole or in part, by the system 100 shown in FIG. 1, or more specifically, by uniform platform 106 or 200 shown in FIGS. 1 and 2, implemented via one or more processors (e.g., processor 208), transceivers (e.g., transceiver 206), and/or via computer-executable instructions stored on non-transitory computer-readable medium or media. The method 600 may be stored in memory (e.g., memory 204) as one or more instructions or routines.

The method 600 may begin by receiving electronic information generated at a first computing environment (block 602). The method 600 may proceed by determining whether the received electronic information is useful across multiple subscribed computing environments (block 604). To determine the usefulness of electronic information, the uniform platform 200 may survey computing environments 102 subscribed to the uniform platform 200 and compare survey results with metadata within the received electronic information. Specifically, the electronic information sharing module 214 of the uniform platform 200 may be configured to receive survey data from the subscribed computing environments 102, where such survey data describes the types of electronic information that subscribed computing environments 102 desire or find useful. For example, computing environments 102B and 102C may submit survey data that indicate that driving data would be desirable for use (e.g., to determine a driving score and number of points for an augmented reality driving video game, respectively). Therefore, if the electronic information sharing module 214 receives electronic information generated at computing environment 102A, where the electronic information includes metadata indicating telematics driving data, the electronic information sharing module 214 would determine that the electronic information is useful across multiple subscribed computing environments based on a comparison between the metadata and survey data. Further, the electronic information sharing module 214 may be configured with a predeterminable threshold to make such a determination.

If the comparison results indicate that the overlap between the metadata and survey data exceeds the predeterminable threshold, the method 600 may proceed to accepting the electronic information (block 606) by storing the electronic information as aggregated electronic information 210 in memory 204. However, if the comparison results indicate that the overlap between the metadata and survey data is less than the predeterminable threshold, the method 600 may proceed to reject the electronic information (block 608). Therefore, by carrying out method 600, the uniform platform 200 may reject some or all of the electronic information generated at the first computing environment in some embodiments.

Figure 7:
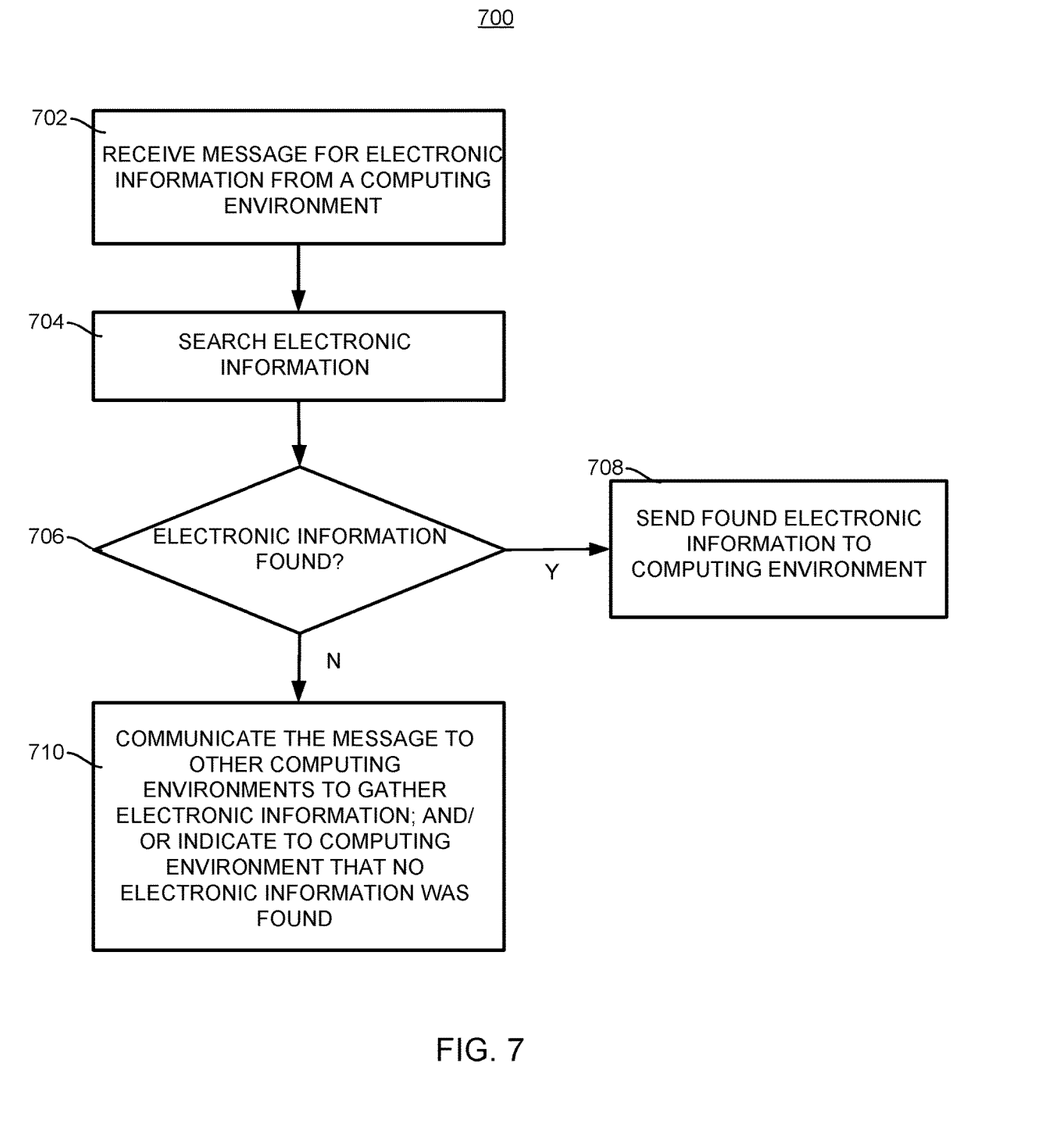
FIG. 7 illustrates an exemplary method for receiving and processing a message for electronic information from a computing environment according to some embodiments.

FIG. 7 illustrates a computer-implemented method 700 for receiving and processing a message for electronic information from a computing environment 102 according to some embodiments. The method 700 may be implemented, in whole or in part, by the system 100 shown in FIG. 1, or more specifically, by uniform platform 106 or 200 shown in FIGS. 1 and 2, implemented via one or more processors (e.g., processor 208), transceivers (e.g., transceiver 206), and/or via computer-executable instructions stored on non-transitory computer-readable medium or media. The method 700 may be stored in memory (e.g., memory 204) as one or more instructions or routines.

The method 700 may begin by receiving a message for electronic information from a computing environment 102 (block 702). The method 700 may proceed by searching for existing electronic information that meets the message (block 704). In some embodiments, the electronic information sharing module 214 may be configured to parse out metadata from the message to use it as a criteria when searching for aggregated electronic information 210 stored in memory 204. The method 700 may proceed by determining whether the requested electronic information has been found (block 706). In some embodiments, the electronic information sharing module 214 may be configured to determine whether the requested electronic information has been found based on a comparison between the metadata associated with the message and metadata associated with the aggregated electronic information 210. Further, the electronic information sharing module 214 may be configured with a predeterminable threshold to make such a determination. If the comparison results indicate that the overlap between the metadata associated with the message and metadata associated with the aggregated electronic information 210 exceeds a predeterminable threshold, the method 700 may proceed to send the found electronic information to the requesting computing environment (block 708) by utilizing transceiver 206. However, if the comparison results indicate that the overlap between the metadata associated with the message and metadata associated with the aggregated electronic information 210 is less than a predeterminable threshold, the method 700 may proceed to either communicate the message to other computing environments (e.g., as a job message for a computing environment(s) to begin work on gathering the requested electronic information), indicate to the requesting computing environment that the electronic information has not been found, or both (block 710).

All of the foregoing methods discussed herein may be include additional, less, or alternate actions, including those discussed elsewhere herein. All of the foregoing methods may be implemented via one or more local or remote processors, transceivers, servers, and/or sensors, and/or via computer-executable instructions stored on computer-readable medium or media. The foregoing devices and systems may also include additional, less, or alternate functionality, including that discussed elsewhere herein.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. Finally, unless a claim element is defined by reciting the word "means" and a function without the recital of any structure, it is not intended that the scope of any claim element be interpreted based upon the application of 35 U.S.C. § 112(f). The patent claims at the end of this patent application are not intended to be construed under 35 U.S.C. § 112(f) unless traditional means-plus-function language is expressly recited, such as "means for" or "step for" language being explicitly recited in the claim(s).

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method, carried out by one or more processors and/or transceivers, for utilizing computing environments to enhance sharing of electronic information, the method comprising:
    aggregating, by the at least one processor, via wireless communication or data transmission over one or more radio links or digital communication channels, the electronic information generated at a first computing environment, the electronic information comprising at least one of an algorithm or electronic data;
    receiving, by the at least one processor, a message for at least a portion of the electronic information from a second computing environment, the message comprising an identification of an end-user;
    determining, by the at least one processor, whether the aggregated electronic information associated with the end-user is available;
    in response to determining that the aggregated electronic information associated with the end-user is available:
        transforming the electronic information from a first type to a second type, the first type comprising an electronic information type of the electronic information generated at the first computing environment and the second type comprising another electronic information type consumable by the second computing environment; and
        transmitting, by the at least one transceiver, via wireless communication or data transmission over one or more radio links or digital communication channels, at least a portion of the transformed electronic information of the second type to the second computing environment; and
    in response to determining that the aggregated electronic information associated with the end-user is unavailable:
        sending a job message to a third computing environment for the third computing environment to gather the electronic information on behalf of the second computing environment;
        gathering, by the third computing environment via one or more sensors associated with a vehicle, electronic information of a driving-telematic data type;
        aggregating, by the at least one processor, electronic information generated at the third computing environment;
        transforming the electronic information from the driving-telematic data type to the second type; and
        transmitting, by the at least one transceiver, at least a portion of the transformed electronic information of the second type to the second computing environment.

2. The method of claim 1, wherein the sending of the job message comprises: receiving confirmation from the second computing environment to authorize the sending of the job message.

3. The method of claim 1, wherein the determining comprises:
    verifying, by the at least one processor, a permission setting of the first computing environment granting exchange of the portion of the electronic information with the second computing environment.

4. The method of claim 1, wherein the third computing environment is a mobile device embedded in the vehicle configured to receive or generate telematic data.

5. The method of claim 1, wherein the first computing environment comprises an insurance services environment and wherein the second computing environment comprises a gaming services environment.

6. The method of claim 1, wherein the first type comprises a user profile data type, and wherein the second type comprises a driving insurance data type.

7. The method of claim 6, wherein the first computing environment comprises a gaming services environment and wherein the second computing environment comprises an insurance services environment.

8. The method of claim 7, wherein at least a portion of the transformed electronic information of the second type comprises a driving score.

9. A server for utilizing computing environments to enhance sharing of electronic information, the server comprising:
- a memory configured to store non-transitory computer executable instructions;
- a processor configured to interface with the memory, wherein the processor is configured to execute the non-transitory computer executable instructions to cause the processor to:
  - aggregate, via wireless communication or data transmission over one or more radio links or digital communication channels, the electronic information generated at a first computing environment, the electronic information comprising at least one of an algorithm or electronic data;
  - receive a message for at least a portion of the electronic information from a second computing environment, the message comprising an identification of an end user;
  - determine whether the aggregated electronic information associated with the end-user is available;
  - in response to the aggregated electronic information associated with the end-user determined to be available:
    - transform the electronic information from a first type to a second type, the first type comprising an electronic information type of the electronic information generated at the first computing environment and the second type comprising another electronic information type consumable by the second computing environment; and
  - in response to the aggregated electronic information associated with the end-user determined to be unavailable:
    - send a job message to a third computing environment for the third computing environment to gather the electronic information of a driving-telematic data type via one or more sensors associated with a vehicle on behalf of the second computing environment;
    - aggregate electronic information generated at the third computing environment; and
    - transform the electronic information from the driving-telematic data type to the second type; and
- a transceiver configured to interlace with the processor and communicate via wireless communication or data transmission over one or more radio links or digital communication channels, wherein the transceiver is configured to transmit at least a portion of the transformed electronic information of the second type to the second computing environment.

10. The server of claim 9, wherein to send the job message comprises:
- to receive confirmation from the second computing environment to authorize the sending of the job message.

11. The server of claim 9, wherein to determine comprises:
- to verify, by the at least one processor, a permission setting of the first computing environment granting exchange of the portion of the electronic information with the second computing environment.

12. The server of claim 9, wherein the third computing environment is a mobile device embedded in the vehicle configured to receive or generate telematic data.

13. The server of claim 9, wherein the first computing environment comprises an insurance services environment and wherein the second computing environment comprises a gaming services environment.

14. The server of claim 9, wherein the first type comprises a driving-telematics data type, and wherein the second type comprises a driving insurance data type.

15. The server of claim 14, wherein the first computing environment comprises a gaming services environment and wherein the second computing environment comprises an insurance services environment.

16. The server of claim 15, wherein at least a portion of the transformed electronic information of the second type comprises a driving score.

17. A non-transitory computer readable medium containing a set of computer readable instructions for utilizing computing environments to enhance sharing of electronic information, that when executed by a processor configure the processor to:
- aggregate, via wireless communication or data transmission over one or more radio links or digital communication channels, the electronic information generated at a first computing environment, the electronic information comprising at least one of an algorithm or electronic data;
- receive a message for at least a portion of the electronic information from a second computing environment, the message comprising an identification of an end-user;
- determine whether the aggregated electronic information associated with the end-user is available;
- in response to the aggregated electronic information associated with the end-user determined to be available:
  - transform the electronic information from a first type to a second type, the first type comprising an electronic information type of the electronic information generated at the first computing environment and the second type comprising another electronic information type consumable by the second computing environment; and
- in response to the aggregated electronic information associated with the end-user determined to be unavailable:
  - send a job message to a third computing environment for the third computing environment to gather the electronic information of a driving-telematic data type via one or more sensors associated with a vehicle on behalf of the second computing environment;
  - aggregate electronic information generated at the third computing environment; and transform the electronic information from the driving-telematic data type to the second type.

* * * * *